J. F. HINES & G. FELLER.
BEATER FOR THRESHING MACHINES.
APPLICATION FILED JULY 26, 1909.

947,157.

Patented Jan. 18, 1910.

WITNESSES
F. C. Barry
C. E. ...

INVENTOR
JEFFERSON F. HINES
GEORGE FELLER
BY Munn & Co.
ATTORNEYS

UNITED STATES PATENT OFFICE.

JEFFERSON FRANKLIN HINES, OF STRAWBERRY POINT, AND GEORGE FELLER, OF OSBORNE, IOWA.

BEATER FOR THRESHING-MACHINES.

947,157. Specification of Letters Patent. Patented Jan. 18, 1910.

Application filed July 26, 1909. Serial No. 509,751.

*To all whom it may concern:*

Be it known that we, JEFFERSON FRANKLIN HINES and GEORGE FELLER, citizens of the United States, and residents of Strawberry Point and Osborne, in the county of Clayton and State of Iowa, have made certain new and useful Improvements in Beaters for Threshing-Machines, of which the following is a specification.

Our invention is an improvement in beaters for threshing machines, and consists in certain novel constructions and combinations of parts hereinafter described and claimed.

The object of the invention is to provide a beater frame, simple in construction while efficient for the purpose, and which may be easily removed and replaced, and whose stroke may be adjusted in length independently of the other frames in the series.

Figure 1:
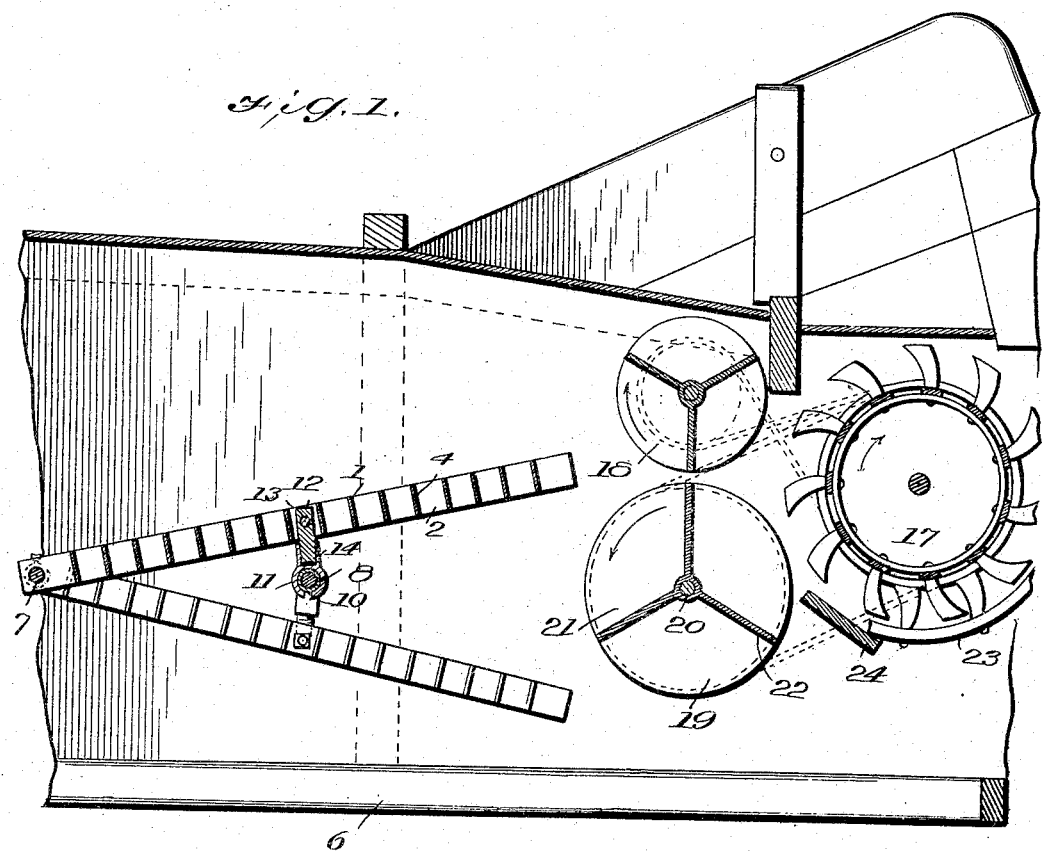
Figure 2:
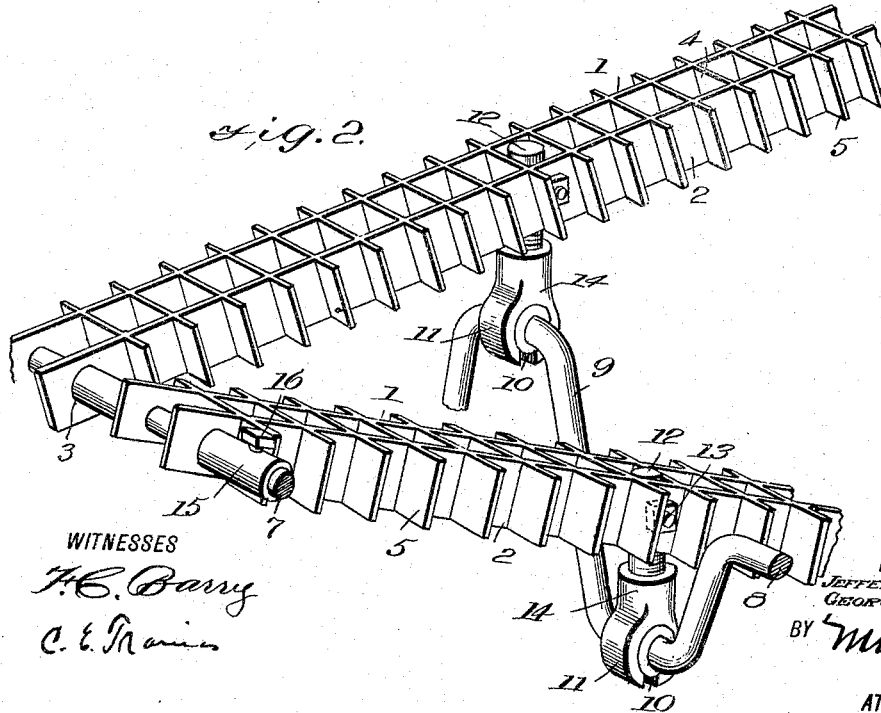

Referring to the drawings forming a part hereof, Figure 1 is a partial longitudinal section of a thresher provided with the improvement, and Fig. 2 is a perspective view of a portion of the beater.

The embodiment of the invention shown in the drawing is of a pair of spaced parallel plates 1 and 2, each of which is provided at one end with an opening 3, the opening of one plate registering with the opening of the other. The plates are connected at spaced intervals by transverse partitions or cross plates 4, and the partitions are extended beyond the longitudinal plates on each side as at 5. The cross plates and longitudinal plates are preferably integral the whole forming a beater frame, of which there are several arranged side by side, within the frame 6 of the machine. The beater frames are supported by a shaft 7 journaled transversely of the frame 6 of the machine, the shaft passing through the openings 3 of the respective frames, and by a crank shaft 8, provided with a plurality of crank arms 9. At approximately the center of each frame, the plates 1 and 2 are provided with registering openings, and each of the crank arms is provided with a collar 10, on which is journaled a split bearing 11 in a bearing block 14.

The bearing block 14 is provided in its end with a threaded opening in which is received the end of a stem 12, and the stem has a transverse opening registering with the openings in the plates 1 and 2, and a bolt 13 passes through the registering openings for securing the parts together. The alternate crank arms on the crank shaft extend in one direction, and the intermediate ones extend in the opposite direction, so that the alternate frames move at all times in the opposite direction from the intermediate frames. The frames are spaced apart from each other at their rear ends by means of sleeves 15, journaled on the shaft 7, and the sleeves are retained in adjusted position by a set screw 16, threaded through the sleeve and engaging the shaft. The beaters are arranged in the machine frame, behind the cylinder 17, and a pair of beater rolls 18 and 19 are interposed between the cylinder and the beaters, the said rolls rotating in opposite directions as indicated by the arrows in Fig. 1. Each of the beater rolls consists of a central shaft 20, provided at each end with a disk 21, and a plurality of radial blades 22 extending between the disks.

In operation, the grain is fed to the cylinder, which rotates in the direction of the arrow in Fig. 1, and passes between the periphery of the cylinder and the concave 23, over a deflecting board 24 to and between the beater rolls. The cylinders and concave act in the usual manner, and the beater rolls separate a portion of the grains from the chaff and stalks. From the beater rolls the grain falls upon the improved beaters, and is tossed up by one series of frames while it is struck down by the other, thus effectually completing the separation of the grains from the stalks and chaff.

It will be evident from the description, that while simple in construction the racks are very efficient, and present a maximum of supporting surface with a maximum of open space through which the grain may fall. The individual frames are easily removed and replaced, and may be adjusted with respect to the crank shaft by means of the stem 12.

It will be observed that the end of the stem extends through the space between two partitions, so that it may have a free swinging movement. When it is desired to adjust the stroke of the frames or racks, the bolt 13 is removed, and replaced after the adjustment is made.

It will be observed that the cross plates extend beyond the longitudinal plates upon each side, thus insuring that the straw will be upheld throughout the full extent of the beater frame, and that it will not pass through between the individual frames.

We claim—

1. A device of the class described comprising a plurality of beater frames; each frame consisting of parallel spaced longitudinal plates arranged with their widest dimension vertical, and a plurality of integral cross plates connecting the first named plates at spaced intervals, and projecting on each side thereof, said cross plates being arranged with their widest dimensions vertical, a shaft at one end of the frames and upon which they are journaled, a crank shaft intermediate the ends of the frame, and provided with a crank arm for each frame, the alternate arms extending in the same direction, and the intermediate arms extend in the same direction, and in the opposite direction to the alternate arms, a block for each arm and provided with a threaded opening and with a split bearing in which the arm is journaled, and a stem pivoted to the beater frame and threaded into the opening of the block.

2. A device of the class described comprising a plurality of beater frames, each frame consisting of parallel spaced longitudinal plates, arranged with their widest dimensions vertical, and a plurality of integral cross plates connecting the first named plates at spaced intervals, and projecting on each side thereof, said cross plates being arranged with their widest dimensions vertical.

3. A beater frame comprising a pair of spaced parallel plates and a plurality of cross plates connecting the first named plates at spaced intervals and extending beyond the sides thereof, said plates being integral with each other.

4. A beater frame comprising a pair of spaced parallel plates, and a plurality of cross plates connecting the first named plates at spaced intervals and extending beyond the sides thereof.

5. A beater frame comprising spaced parallel longitudinal plates, and integral spaced parallel cross plates connecting the longitudinal plates and extending beyond the sides thereof.

6. A beater frame comprising spaced parallel longitudinal plates, and integral spaced parallel cross plates connecting the longitudinal plates and extending beyond the sides thereof, a crank shaft provided with crank arms, a bearing block having a split bearing in which the arm is journaled, and a stem pivoted to the frame and threaded into the block.

7. A beater frame comprising spaced parallel longitudinal plates, and integral spaced parallel cross plates connecting the longitudinal plates and extending beyond the sides thereof, a crank shaft provided with crank arms, a bearing block having a split bearing in which the arm is journaled, and a stem pivoted to the frame and threaded into the block, a crank shaft having a crank arm, a bearing block on the arm, and an expansible and contractible connection between the block and the frame.

8. In a threshing machine, a crank shaft, a beater frame pivoted by one end, a bearing block journaled on the crank shaft, and stem pivoted to the frame and threaded into the block.

JEFFERSON FRANKLIN HINES.
GEORGE FELLER.

Witnesses:
JOHN ALDERSON,
T. L. STEINES.